(12) United States Patent
Deyaf et al.

(10) Patent No.: US 9,987,981 B1
(45) Date of Patent: Jun. 5, 2018

(54) APPARATUS AND METHOD FOR VEHICLE RELATED WORK ZONE INTRUSION DETECTION

(71) Applicant: Feniex Industries, Inc., Austin, TX (US)

(72) Inventors: Hamza Deyaf, Austin, TX (US); Nicholas Mazzanti, Austin, TX (US); Kyle Hale, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days. days.

(21) Appl. No.: 15/655,901

(22) Filed: Jul. 21, 2017

(51) Int. Cl.
*B60Q 5/00* (2006.01)
*G08G 1/16* (2006.01)

(52) U.S. Cl.
CPC ............ *B60Q 5/006* (2013.01); *G08G 1/166* (2013.01)

(58) Field of Classification Search
CPC .... B60K 31/0008; B60Q 1/525; B60Q 5/006; B60Q 9/008; B60T 7/16; B60T 7/22; B60W 30/16; B60W 2550/402; G01S 7/415; G01S 13/931; G01S 15/931; G01S 17/936; G01S 2013/9375; G01S 2013/9378; G08G 1/0965; G08G 1/163; G08G 1/164; G08G 1/165; G08G 1/166
USPC ........................................................ 340/435
See application file for complete search history.

(56) References Cited

U.S. PATENT DOCUMENTS

| | | | | |
|---|---|---|---|---|
| 5,734,336 A | * | 3/1998 | Smithline | B60Q 9/008 180/168 |
| 5,999,092 A | * | 12/1999 | Smith | G01S 13/931 340/436 |
| 6,861,970 B1 | * | 3/2005 | Garland | G01S 7/4806 342/175 |
| 2006/0187009 A1 | * | 8/2006 | Kropinski | B60Q 5/006 340/435 |
| 2008/0272955 A1 | * | 11/2008 | Yonak | G01S 13/931 342/54 |
| 2010/0134263 A1 | * | 6/2010 | Mathony | G08G 1/161 340/435 |
| 2010/0152972 A1 | * | 6/2010 | Attard | B62D 15/027 701/42 |
| 2011/0196568 A1 | * | 8/2011 | Nickolaou | B60W 30/0953 701/31.4 |
| 2011/0221624 A1 | * | 9/2011 | Kavaler | G01S 7/003 342/22 |

(Continued)

*Primary Examiner* — Quan-Zhen Wang
*Assistant Examiner* — Stephen Burgdorf

(57) ABSTRACT

Embodiments of an apparatus and methods of use thereof are provided. An apparatus for work zone intrusion detection related to a stationary vehicle, whereby the apparatus includes a processor configured to receive radar detection data about an oncoming vehicle and determine when to trigger an alarm sound in accordance with the radar detection data upon determining that the oncoming vehicle is moving in a direction and at an orientation to collide with the stationary vehicle. A method of using an apparatus for detecting and warning against intrusion in a work zone around a stationary vehicle is provided that includes obtaining, from a radar unit, detection data for a moving vehicle or object approaching the stationary vehicle, and determining, using a processor, when to trigger an alarm sound to allow a response time according to the detection data and a warning mode.

18 Claims, 5 Drawing Sheets

(56) References Cited

U.S. PATENT DOCUMENTS

| | | | |
|---|---|---|---|
| 2012/0101711 A1* | 4/2012 | Furmston | G01S 7/415 701/300 |
| 2012/0306664 A1* | 12/2012 | Geter | G08G 1/166 340/903 |
| 2013/0116859 A1* | 5/2013 | Ihlenburg | G06F 17/00 701/2 |
| 2016/0042575 A1* | 2/2016 | Ganguly | G07B 15/02 705/13 |
| 2016/0257309 A1* | 9/2016 | Kumar | B60W 30/143 |
| 2016/0304028 A1* | 10/2016 | Hathaway | B60Q 9/008 |
| 2017/0247036 A1* | 8/2017 | Halder | B60W 40/02 |

\* cited by examiner

APPARATUS AND METHOD FOR VEHICLE RELATED WORK ZONE INTRUSION DETECTION

FIELD OF THE DISCLOSURE

The illustrative embodiments relate generally to one or more embodiments for a detection and warning system. More specifically, the illustrative embodiments relate to a detection and warning system that is able to detect oncoming moving vehicles or other objects approaching a stationary vehicle and to provide an audible warning sound such that any individual located outside or near the stationary vehicle may move out of harm's way.

BACKGROUND

Each year a number of fatalities and serious injuries occur to law enforcement, emergency, public safety, and construction personnel due to being struck by a moving vehicle while the individual is located on a highway or other roadway. There are many scenarios where it is part of the occupational duties for a variety of individuals to be located in high traffic and high-speed areas, including highways and roadways. For example, the professional and occupational obligations for law enforcement, emergency, and other public safety personnel, as well as construction and road workers, frequently requires that the work zone of these individuals places them in such high traffic and high-speed areas. These work zones present a number of dangerous conditions by virtue of these individuals being located outside of their vehicles, unprotected, and located near moving vehicles. Even in cases where the vehicle is not moving at a high speed, any collision by a vehicle with an individual is capable of causing death or serious bodily harm after the collision.

SUMMARY

In one aspect, embodiments in the present description are directed to an apparatus for a vehicle. In one embodiment, an apparatus is configured to detect an oncoming vehicle with respect to a stationary vehicle. The apparatus may include a housing having a processor, whereby the processor is configured to receive radar detection data about an oncoming moving vehicle or object and to determine when to trigger an alarm sound in accordance with the radar detection data and in accordance with a determination that the oncoming vehicle or object is moving in a direction to collide with the stationary vehicle. The radar detection data may indicate at least one of the speed and distance of the oncoming vehicle or object with respect to the stationary vehicle. The radar detection data may further indicate a position and an orientation of the oncoming vehicle or object with respect to the stationary vehicle. The housing of the apparatus may further include a transceiver coupled to the processor and configured to receive the radar detection data from a radar unit.

In another aspect, embodiments of the present description may be directed to an exemplary process warning an operator of a stationary vehicle of an oncoming moving vehicle or other object. In one embodiment, the process may include obtaining, from a radar unit, detection data for a moving vehicle or object approaching the stationary vehicle. The process may further include determining, using a processor, when to trigger an alarm sound to allow a response time according to the detection data and a warning mode. The process may further include, determining, using a processor, based on the data obtained by the radar regarding a position and orientation of the oncoming vehicle or object, that the oncoming vehicle or object is moving in a direction to collide with the stationary vehicle. Subsequently, the process may include triggering the alarm sound to alert the operator of the stationary vehicle of the oncoming moving vehicle or object.

In yet another aspect, embodiments of the present description are directed to an apparatus for warning an operator of a stationary vehicle of an oncoming vehicle or other moving object. The apparatus may comprise a controller unit configured for work zone intrusion detection related to the stationary vehicle. The controller unit, in one or more embodiments, may be connectable to a radar unit mountable on the stationary vehicle, wherein the controller unit is configured to receive detection data from the radar unit indicating an oncoming vehicle or other moving object and to trigger an alarm sound in accordance with the detection data to allow a response time according to a warning mode and according to a determination that the oncoming vehicle is moving in a direction to collide with the stationary vehicle based on acquired detection data regarding a position and orientation of the oncoming vehicle or object. The apparatus may further include one or more mode switches for selecting one or more warning modes. Further, the apparatus may further include or be coupled to a sound device having a speaker for sounding the alarm sound. In one or more embodiments, the radar unit and the controller unit are collocated in a single device. Further, the controller unit is mountable with the radar unit on the stationary vehicle.

Other aspects and advantages of the invention will be apparent from the following description and the appended claims.

DETAILED DESCRIPTION

Figure 1:
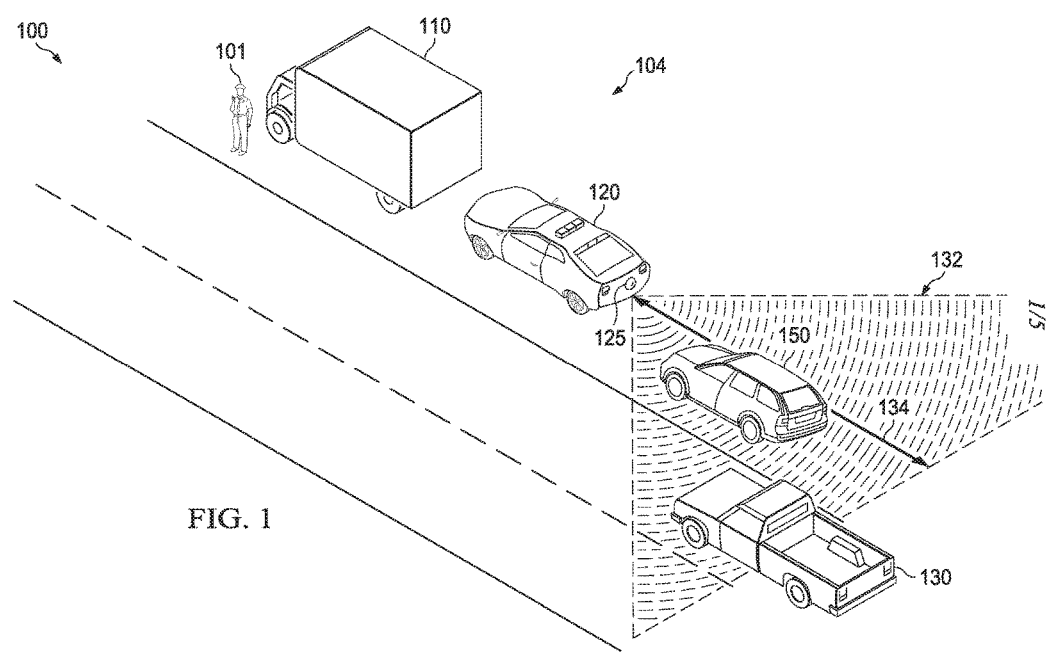
FIG. 1 is pictorial illustration of a detection and warning system mounted on a police vehicle used in a work zone in accordance with an illustrative embodiment.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . . "

As a preface to the detailed description, it should be noted that, as used in this specification, the singular forms "a", "an", and "the" included plural referents, unless the context clearly dictates otherwise.

The present embodiments recognize that there are a variety of scenarios where vehicles may be parked in proximity of and around highway traffic or other oncoming objects, and that individuals located near the parked vehicle are exposed to the risk of collision by the oncoming vehicles or other moving objects.

For example, during any type of traffic stop, police officers must pull over other vehicles due to speeding or another type of traffic violation. In a traffic stop, the police officer uses his or her own vehicle to pull over another person's vehicle to a shoulder or a side of a highway or other roadway. This presents automatic risk to the officer of collision by another oncoming vehicle on the road, because during the traffic stop, the officer is standing near the stopped vehicle, such as at the driver's side window to engage with the driver of the stopped vehicle. Since the officer's attention is directed towards the driver, the officer may not recognize the occurrence of or may not have enough time to avoid damage due to a rear-end or roadside collision with an oncoming vehicle that is out of control or swerves outside its traffic lane towards the police officer or one of the vehicles located on the side of a roadway, street, or highway.

Emergency and medical or safety (EMS) personnel are often working to assist an injured party located on a highway or roadway and are also exposed to the risk of collision by oncoming moving vehicles. In addition, construction and roadside personnel must work near moving traffic on highways and other roadways as part of their occupational duties to build or construct such highways and roadways, install pipelines, and conduct a variety of other construction and roadside repair related tasks. Such exemplary individuals are frequently around or in vehicles in a hazardous work zone where they may be at risk of collision with other nearby passing vehicles or objects. The risk is further increased during night time and/or in conditions with poor visibility, such as during rainstorms, fog, or icy weather.

Therefore, the illustrative embodiments presented in the present disclosure recognize the immediate need for a detection and warning system that alerts any individual, including, without limitation, a police officer, other law enforcement personnel, emergency medical service personnel, construction workers, or any other type of person of an oncoming, moving vehicle. Such a detection or warning system may provide the alerted individual with at least a minimum amount of reaction time for the individual to move out of harm's way and to avoid collision by the oncoming vehicle. Such a detection and warning system is a life saver for all individuals in any work zone related area where there is the risk of collision by other oncoming vehicles. Further, the detection and warning system may further detect objects other than moving vehicles, for example pedestrians, animals or other unforeseen objects that may pass near the stationary vehicle, and alert the individual to assess the risk of whether the oncoming object or person is dangerous or not.

Thus, the different illustrative embodiments recognize the need for an apparatus that may be mounted on the transportation vehicle of an individual who may have to park the vehicle on the side of the road or highway where other vehicles may be passing by.

As described below, one or more embodiments of the system described in the present description may be mounted, in whole or in part, on the rear side of a stationary vehicle, including, but not limited to, being located on a rear bumper or licenses plate of a vehicle. Further, one or more embodiments of a system described in the present description may be used to detect any moving vehicle or object that intrudes into a defined zone or range of detection around the stationary vehicle. Further, one or more embodiments of a system described in the present description determines whether the oncoming vehicle or object is moving in a direction to collide with the stationary vehicle before triggering an alarm to notify an operator of the stationary vehicle. Upon detection of such, the system sounds an audible alarm to warn any individual near the stationary vehicle to move away or take action to avoid the risk of possible collision between the moving vehicle and the stationary vehicle or the individual.

One or more embodiments of the system may include or may be coupled to a radar unit for detecting an oncoming moving vehicle or object, and a controller unit for processing such information and determining to send a warning sound to alert individuals around the vehicle. A radar unit may be used to detect the moving object within a predefined range from the radar unit, and to determine its speed, and distance from the radar unit as located upon an operator's vehicle. Further, the radar unit may provide detection data regarding the position and orientation of the oncoming vehicle (or other type of moving object) in order to also make a determination whether the oncoming vehicle is moving in a direction likely to collide with the stationary vehicle. Subsequently, a controller unit may determine, based on such information provided by the radar unit, when to trigger the audible alarm sound in order to allow an individual enough time to move away from the oncoming vehicle or other dangerous moving object in order to avoid collision.

In one or more embodiments, the detection and warning system herein may be any suitable fixture that may include an alarm sound device and a controller unit coupled to the radar unit. Alternatively, the controller unit and the radar unit may be integrated within a single system box. The controller unit and the radar unit may be located within a housing for a single device or within multiple housings of multiple devices. Such devices may further include a speaker or sound device that emits the alarm sound. Further a radar unit, in accordance with embodiments described herein, may be mounted on or attached to a vehicle, for example on a rear or front bumper, on the vehicle roof, or any other suitable location in or on a vehicle. The location where the system is placed or mounted and the orientation of the radar unit determines the direction from which oncoming objects can be detected. For instance, the system or at least the radar unit may be mounted on the rear hood or bumper of a police vehicle to cover a detection range extending outwardly away from and in a sideways direction behind the vehicle.

In one or more embodiments described herein, a control unit may be preprogrammed with settings to determine when to sound the alarm upon detecting, via the radar unit, a moving vehicle or object near the stationary vehicle, whereby the moving vehicle or object appears to be on a collision course with the stationary vehicle. The speed of the oncoming moving vehicle or object, as well as the position and orientation of the moving vehicle or object, as detected with the radar unit may be used by the control unit to determine how soon to start the alarm sound based on the settings. For instance, in the case of a faster oncoming moving vehicle, the alarm sound may be triggered sooner to allow an individual near the stationary vehicle a longer time to respond as opposed to a slower oncoming moving vehicle. Accordingly, in one or more embodiments, the settings for the control unit may determine the relation between the detected speed of the moving vehicle and when to start the alarm. Further, the settings for the control unit may also determine the threshold closing distance between the stationary and moving vehicles that triggers an alarm, depending on the position and orientation of the moving vehicles. Embodiments with further details are described below.

Figure 2:
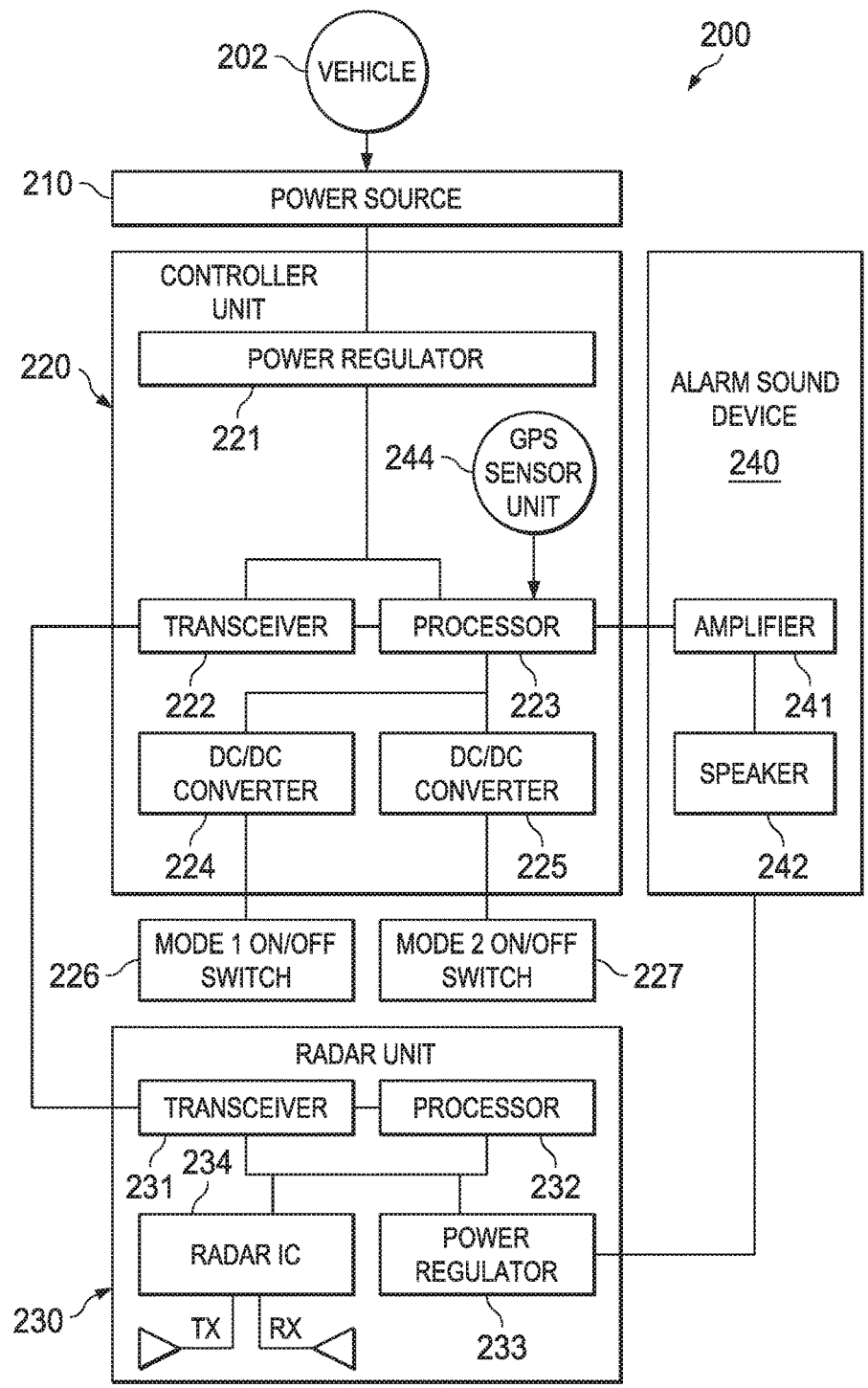
FIG. 2 is a block diagram of components of a vehicle related work zone intrusion detection system in accordance with an illustrative embodiment.
Figure 3:
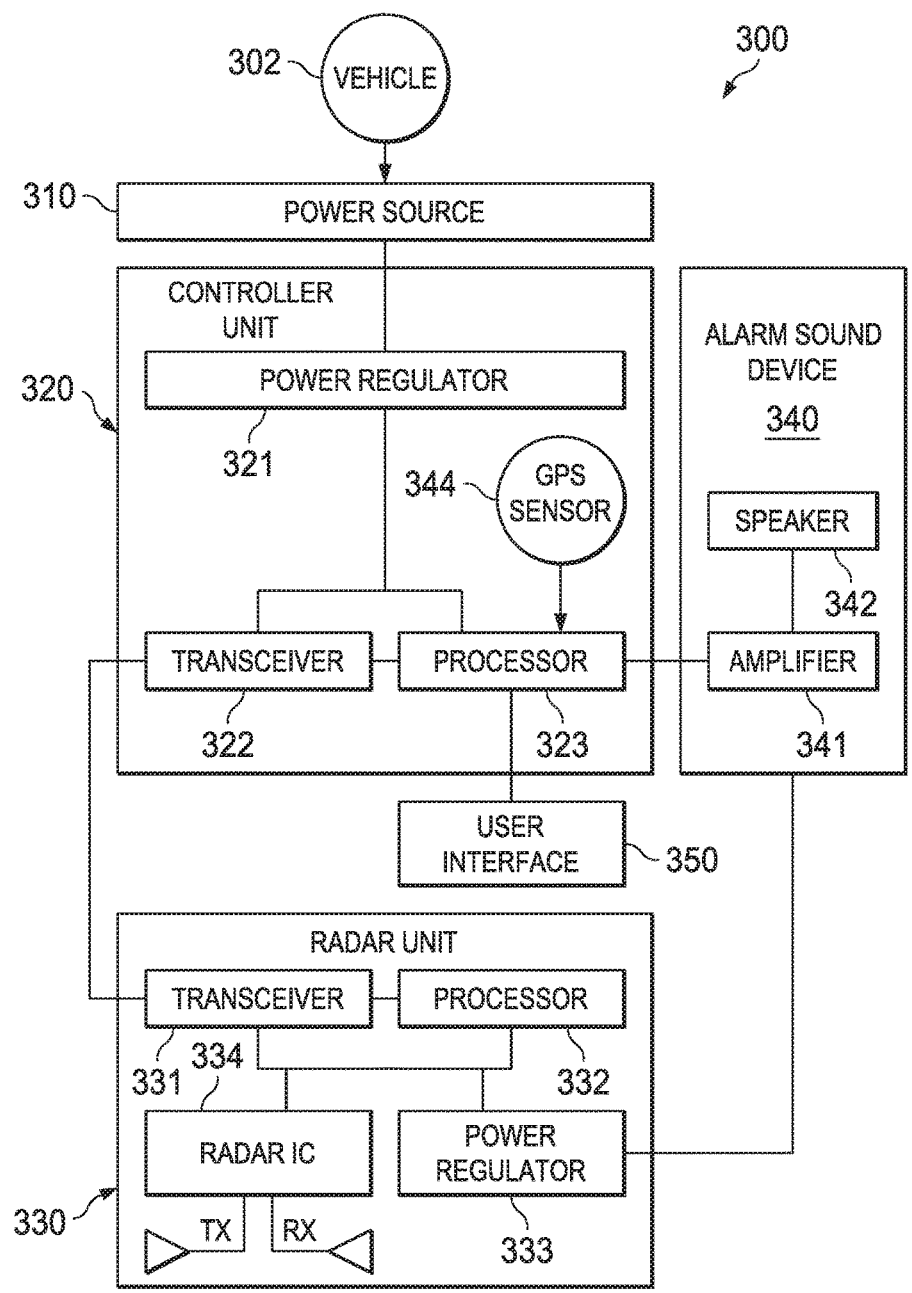
FIG. 3 is a block diagram of components of another vehicle related work zone intrusion detection system in accordance with an illustrative embodiment.

Turning to FIG. 1, FIG. 1 shows a schematically illustrated scenario for a detection and warning system mounted on a vehicle as used by an individual in the individual's work zone in accordance with an illustrative embodiment. The detection and warning system 100 shown in FIG. 1 may include a number of components as described further below in the present description. In FIG. 1, operator 101 is an individual or person who operates in a work zone that places the individual near oncoming moving vehicles and traffic. Operator 101 also owns and operates vehicle 120, which also includes a radar unit, such as radar unit 125 to detect oncoming moving vehicles. Operator 101 is essentially the user of radar unit 125, and any other accompanying devices that are part of the detection and warning system 100 (e.g. controller units 220 and 320 and alarm warning devices 240 and 340 as shown in FIGS. 2 and 3). In the exemplary, non-limiting embodiment shown in FIG. 1, operator 101 is also a police officer who has pulled over passenger vehicle 110 in a routine traffic stop.

As shown in FIG. 1, a passenger vehicle 110 may be pulled over by the side of a road or highway and police vehicle 120 is located behind passenger vehicle 110. In one or more embodiments, vehicle 120 is the transportation vehicle that was used to bring police officer 101 to this work zone 104. A work zone, as used herein, may refer to an area in which an individual performs his or her occupational duties and responsibilities. In one or more implementations, a work zone, such as work zone 104, may include, but is not limited to, any portion of or a highway, roadway, street, intersection, lane, or any area of transit.

In a case where individual 101 is a police officer, he or she must exit the stationary vehicle 120 and move to the driver's side or passenger's side of the passenger vehicle 110, as shown in FIG. 1. Accordingly, the police officer 101 may be at risk of being struck by any of the oncoming vehicles, such as, for example, oncoming vehicle 150, that may be moving at a high speed in the same direction and in proximity to the police officer 101, and also is moving in a direction to collide with stationary vehicle 120.

Figure 4:
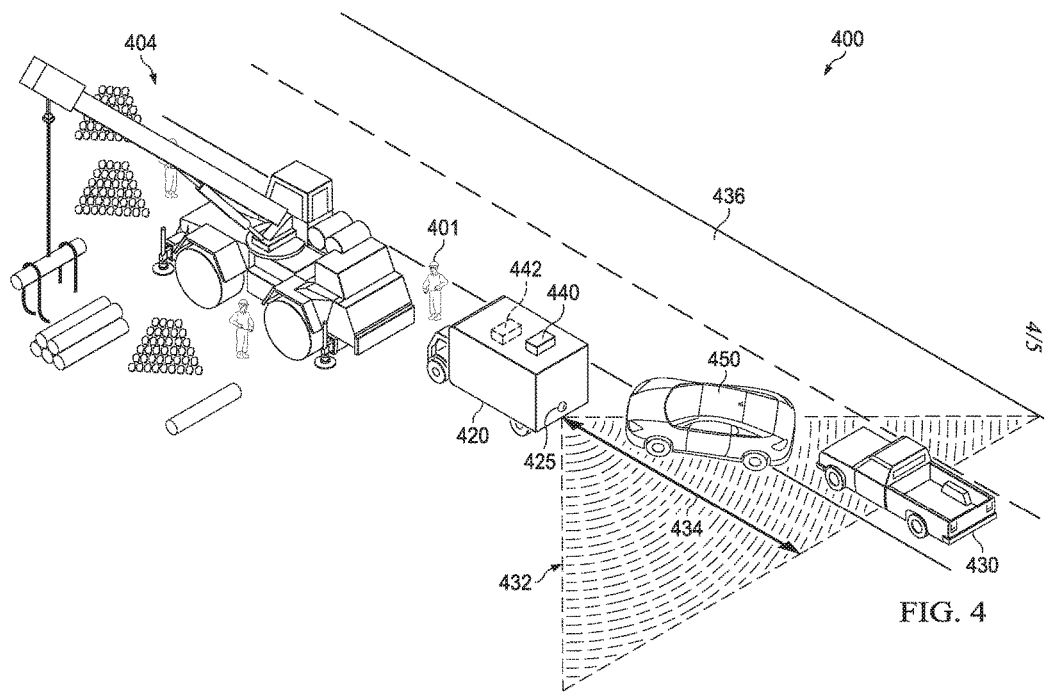
FIG. 4 is a pictorial illustration of a detection and warning system mounted on a construction related or public works vehicle in accordance with an illustrative embodiment.

It is noted that a detection and warning system, in accordance with embodiments described herein, may be useful for any type of individual other than a police officer or other law enforcement personnel, and that vehicle 120 may be any type of vehicle other than a police vehicle. A detection and warning system in accordance with that shown in FIG. 1 may be utilized in multiple applications, including for EMS personnel, in the construction industry (e.g. as shown in FIG. 4 and described further below) when located on roadways or highways, or in association with public works repair, to name a few implementations without limitation thereto. Indeed, many such individuals work in dangerous work zones that locate them in proximity of moving oncoming vehicles, such as oncoming vehicle 150

As shown in FIG. 1, detection and warning system 100 may further comprise or be connected to a radar unit 125. In one or more embodiments, radar unit 125 may be mounted on any external or internal surface or location of vehicle 120. In an exemplary, embodiment, radar unit 125 may be mounted at any point along a rear bumper or trunk of the stationary vehicle 120, although any other suitable location on or in stationary vehicle 120 may alternatively be used. As shown in one exemplary embodiment in FIG. 1, radar unit 125 is centrally located on a rear bumper of stationary vehicle 120. In some embodiments, radar unit 125 may be mounted over and/or surrounding a license plate of stationary vehicle 120. Further, radar unit 125 may include a housing that comprises or is coupled to one or more electrical and/or mechanical components that operate to implement one or more functions described below.

Radar unit 125 may be permanently or removeably coupled to a surface of police vehicle 120 using any affixation techniques or methods known or yet to be discovered in the art. Such affixation methods may include, without limitation thereto, using fasteners, ties, cables, adhesives, or soldering/welding to affix radar unit 125 to a surface of stationary vehicle 120. Alternatively, in one or more embodiments, radar unit 125 may be removeably coupled to a base (not shown), whereby the base is permanently coupled to stationary vehicle 120, but the operator or owner of radar unit 125 (i.e. individual 101) may remove and re-attach radar unit 125 as desired.

Radar unit 125 may use radar, which as understood by those skilled in the art, is an object detection system that uses radio waves. Radar unit 125 may be used to detect a range, angle, and/or velocity (or combination thereof), as well as a position and orientation of any oncoming vehicle, such as oncoming vehicles 130 and 150, with respect to police vehicle 120's position. As shown in FIG. 1, in one or more embodiments, a detection zone or range 132 may extend over a specific range that extends from a rear position of the stationary vehicle 120. Detection zone or range 132 may be configured by a user, in some applications, or by manufacturer settings for one or more devices included in detection and warning system 100, as further explained below.

FIG. 1 shows two oncoming vehicles, 130 and 150. In some embodiments, an alarm may be triggered using one or more components of detection and warning system 100 upon detecting that an oncoming vehicle or object is headed on a collision course with stationary vehicle 120. Oncoming vehicle 130 is traveling in a direction parallel to that of police officer 101 and stationary vehicle 120, and appears to be staying in its designated lane on the roadway and/or highway. As shown in FIG. 1, oncoming vehicle 130 passes through detection range 132 of radar unit 125. In one embodiment, radar unit 125 detects oncoming vehicle 130 and determines that oncoming vehicle 130 is not likely to collide with stationary vehicle 120.

On the other hand, oncoming vehicle 150 is moving in a direction where it is likely that oncoming vehicle 150 will collide with either stationary vehicle 120, or police officer 101, or both. As shown in FIG. 1, oncoming vehicle 150 is moving directly towards stationary vehicle 120. Therefore, in some applications, detection and warning system 100 is adapted to only trigger an alarm upon detecting that the position and orientation of an oncoming vehicle, such as oncoming vehicle 150, makes it likely that the oncoming vehicle will collide with stationary vehicle 120. The likelihood of injury being caused to police officer 101 is high from oncoming vehicle 150 as opposed to oncoming vehicle 130. Thus, an alarm sound is triggered as oncoming vehicle 150 moves closer to the rear of stationary vehicle 120, because oncoming vehicle 150 is traveling in a direction and location that makes oncoming vehicle 150 likely to collide with stationary vehicle 120.

In some embodiments, detection and warning system 100 still detects and obtains data, such as the position, orientation, speed, and distance of the non-collision vehicle, i.e. oncoming vehicle 130 with respect to stationary vehicle 120. However, an alarm is not triggered as oncoming vehicle 130 moves closer to stationary vehicle 120 to a threshold distance, because the detected data obtained by radar unit 125 for oncoming vehicle 130 indicates that oncoming vehicle 130 is not headed in a direction to cause a collision with stationary vehicle 120. Thus, detection and warning system 100 is configured not to trigger an alarm every time a vehicle or other object enters detection range 132, but rather when the oncoming vehicle or object is positioned and oriented in a direction to collide with a stationary vehicle having a radar unit (e.g. stationary vehicle 120).

Notwithstanding the above, those of ordinary skill in the art will appreciate that, in alternative embodiments, detection and warning system 100 may be configured to trigger an alarm upon detecting any oncoming vehicle or object, including oncoming vehicle 130, even if oncoming vehicle 130 is not moving directly towards and on a collision course with stationary vehicle 120.

Accordingly, any oncoming moving vehicle, such as oncoming moving vehicle 130, passing on the roadway or highway near the stationary vehicle 120 (e.g. police vehicle in one scenario as depicted in FIG. 1) may be detected by radar unit 125 when the oncoming moving vehicle 130 enters range 132. Range 132 may thus extend outwardly and to the side over a particular range based on a fixed location of radar unit 125 as located on stationary vehicle 120. But, as noted above, an alarm is triggered upon detecting an oncoming vehicle is traveling in a direction and orientation where it is likely a collision with stationary vehicle 120 may occur. A collision course may be determined based on detecting an oncoming vehicle (e.g. 150) that is moving directly towards stationary vehicle 120, including any side of stationary vehicle 120.

As further explained below, in one or more embodiments radar unit 125 may be coupled to a controller unit, such as controller unit 220 or 320 in FIGS. 2 and 3. Further, radar unit 125 may be coupled to an alarm sound device (e.g. alarm sound device 240 shown in FIG. 2 and alarm sound device 340 shown in FIG. 3). Upon detecting that oncoming moving vehicle 150 has entered within the boundaries of range 132, an alarm, including loud audible alarm sounds, may be triggered to alert and capture the attention of the operator 101 of police vehicle 120. The alarms provided from an alarm sound device, such as alarm sound device 240 and 340, may provide adequate warning time for individual 101 to move him or herself out of harm's way if needed to avoid collision from oncoming moving vehicle 150.

It is one of the objectives of the detection and warning system, according to embodiments described in the present description to assist an operator of a vehicle in a work zone, such as operator 101, such that, if he or she is focused on a current task or duty while working in a work zone, the alarms emitted by an alarm warning device (e.g. 240 and 340) may alert the operator 101 and draw his or her attention to an oncoming moving vehicle 150 (or other oncoming objects) that may pose a danger to his or her safety and security. Advantageously, detection and warning systems in accordance with embodiments described herein provide alarms and alerts to individuals, even if the individuals are located outside of their vehicles, such as in the scenario shown in FIG. 1, whereby operator 101 is located near vehicle 120.

In one or more embodiments, radar unit 125 may be used to determine a speed (i.e. distance/time) of oncoming moving vehicle 150. Vehicle 150 is detected to be on a collision course with vehicle 120. Upon determining a speed of oncoming moving vehicle 150, distance 134 may be calculated based on the data provided by radar unit 125 regarding the detected speed of the oncoming moving vehicle 150. Distance 134, as shown in FIG. 1, is the distance between stationary vehicle 120 and oncoming moving vehicle 150. It is noted that the Figures are not to scale and that distance 134 is not limited to that shown in FIG. 1. The detected speed and/or distance may be used to determine (for example, by controller unit 220 or 320 in FIGS. 2 and 3) when to trigger a warning alarm to provide adequate warning time to operator 101 from an accompanying alarm warning device (e.g. alarm warning device 240 and 340 shown in FIGS. 2 and 3) that may also be located on or in vehicle 120.

Turning to FIG. 2, FIG. 2 shows a block diagram of an exemplary vehicle related warning and detection system. Warning and detection system 200 may be in accordance with warning and detection system 100 as shown in FIG. 1 and as previously described above. Warning and detection system 100 of FIG. 1 may further include any or all of the component shown in FIG. 2 or FIG. 3.

As shown in FIG. 2, warning and detection system 200 may be implemented and located on a vehicle, such as vehicle 202. Vehicle 202 may be any type of vehicle. For instance, vehicle 202 corresponds to stationary vehicle 120 shown in FIG. 1. The term "vehicle" as used herein is meant to indicate any transportation vehicles including road vehicles, off-road vehicles, wheel-based vehicles, special track vehicles, or other driven vehicles. This further includes, without limitation, motorcycles and/or other two or three wheeled vehicles.

In one or more embodiments, detection and warning system 200 shown in FIG. 2 includes a number of operatively connected components, such as, controller unit 220, a radar unit 230, and an alarm warning device 240. In one or more embodiments, system 200 obtains the necessary power from a power source, such as power source 210. Power source 210 supplies power to these components via suitable wiring. In one embodiment, without limitation thereto, power source 210 may be a vehicle battery located in vehicle 202 that supplies the components with power. Examples of vehicle batteries that may serve as a power source, such as power source 210 may include, but are not limited to, lead-acid batteries used in fuel vehicles, or lithium-ion batteries used in electric or hybrid vehicles. Further, one or more components of system 200 may be connected to power source 210 (e.g. vehicle battery) via a cigarette lighter located in vehicle 202. In order for the detection and warning system 200 to be activated, when power source 210 is the vehicle battery, vehicle 202 should be powered on or at least in accessories mode in order for the detection and warning system 200 and attached components to receive power.

In alternative embodiments, power source 210 may not be a vehicle battery. Rather, in some embodiments, controller unit 220 may include its own power source 210, as can radar unit 230 and alarm sound device 240, or alternatively, each component is collocated in a common housing of a single device that includes its own power source 210. Accordingly, in some embodiments, power source 210 may be any type of electric battery known in the art that supplies electricity to one or more components in system 200. This may include, but is not limited to, single-use, disposable batteries.

The controller unit 220, the radar unit 230 and the alarm sound device 240 may be connected to the power source 210 via wires or electric cables in any suitable arrangement. For example, the components may be supplied power from the power source 210 directly or through other components. In one implementation, any one of the components may be connected to the power source 210 and, in turn, supply some of the power to the other components via a cable.

In one or more embodiments, the controller unit 220, the radar unit 230, and the alarm sound device 240 may each be separate components that are connected via any suitable wired or wireless connections. In an embodiment, the controller unit 220 and the radar unit 230 are connected via an RJ45 serial cable.

Alternatively, the controller unit 220 may be integrated with one or both of the radar unit 230 and the alarm sound device 240 in a single apparatus or device having a common housing. An apparatus containing controller unit 220, radar unit 230, and alarm sound device 240 may be of any suitable size or shape, and made of any materials known in the art. Further, controller unit 220, radar unit 230, and alarm sound device 240 may be mounted at any point on an internal or external surface as desired on vehicle 202. In some embodiments, vehicle 202 may be a police vehicle, an EMS vehicle or another work zone related vehicle as described above, or any other type of vehicle having any use.

Controller unit 220 may be collocated within a single apparatus as the radar unit 230 or may be located somewhere in vehicle 202 and connected via wires or wirelessly to the mounted radar unit 230. The alarm sound device 240 may also be collocated with the radar unit 230 or may be located elsewhere in vehicle 202, for example, without limitation, on a dashboard of vehicle 202. In one or more embodiments, without limitation thereto, it may be preferable for controller unit 220 to be located proximate to the operator of vehicle 202 so that the operator of vehicle 202 may easily power on and off controller unit 220, select one or more warning modes (e.g. 226 and 227), and select other functions or features of controller unit 202. However, those of ordinary skill in the art will appreciate that controller unit 220 is not restricted in its location.

Controller unit 220 includes electric or electronic components for determining when to trigger the alarm from alarm sound device 240 upon detecting an oncoming moving vehicle (such as oncoming moving vehicle 150), as described above. The controller unit 220 includes processor 223 that receives the detection data from the transceiver 222. The processor 223 can be any type of a processor suitable for processing such data, e.g., digital data. For example, the processor 223 can be a chip, a central processing unit (CPU), a computer board, or an electronic card. The processor 223 processes the detection data to determine when to trigger the alarm sound and forwards the appropriate signal to the alarm sound device 240 to trigger the alarm.

The controller unit 220 may also be coupled to or may itself include two ON/OFF switches 226 and 227. The switches 226 and 227 may be configured to select predefined modes or warning modes that may determine the parameters used by processor 223 for determining when to trigger an alarm emitted by alarm warning device 240. It is noted that a greater or lesser number of switches, such as switches 226 and 227 may be included in alternative configurations. As shown in FIG. 2, switch 226 may be used to select (e.g. turn on or off) warning mode 1 and switch 227 may be used to select warning mode 2.

The pre-defined warning modes 1 and 2 (as selected using switches 226 and 227) may be selected by the user or operator (ex. individual 101) of detection and warning system 200. Alternatively, in one or more embodiments, the predefined warning modes 1 and 2 may be automatically selected based on global positioning system (GPS) data acquired from GPS sensor unit 244. As shown in FIG. 2, GPS sensor 244 may be included with warning and detection system 200. In the case of using location data to determine which one of the predefined warning modes to automatically select, GPS sensor 244 may be coupled to or integrally included to controller unit 220. GPS sensor 244 may be used to send the location information (GPS data) to controller unit 220 (or 320 in FIG. 3) for this purpose.

In one or more embodiments, system 200 may include at least two predefined modes, such as warning mode 1 and warning mode 2 shown in FIG. 2, which may include a highway warning mode and a city warning mode. A highway warning mode may be configured to provide more response time, as compared to city mode, before an oncoming vehicle (e.g. oncoming moving vehicle 150 in FIG. 1 or oncoming moving vehicle 450 in FIG. 4), reaches the same location as vehicle 202. It is known that vehicles are allowed to drive at very high speeds on highways. Most speed limits on highways range anywhere from 60-70 miles per hour. Nevertheless, vehicles traveling on highways normally well exceed these limits, and often reach 90-100 miles per hour or more. For an operator working in a work zone on a highway, such as operator 101 shown in FIG. 1 or operator 401 shown in FIG. 4, there is a much higher risk of a fatality or serious bodily injury occurring if an oncoming vehicle collides into the operator or his or her vehicle due to these higher speeds. Accordingly, system 200 takes into consideration that on a highway, an individual may require earlier warning than in other scenarios to have adequate time to move out of the way of a pending collision, and thus assumes that as a base parameter, an oncoming vehicle is traveling at a higher base speed. In the city warning mode, a shorter response time may be adequate due to the lower traffic speed, and therefore more time may be allowed before triggering the alarm in comparison to the highway mode.

In a non-limiting embodiment, when highway warning mode is selected using one of the switches 226 and 227 on controller unit 220, an individual (e.g. operator 101 or 401) located near vehicle 202 having system 200 may have between 5-20 (or more or less as desired) seconds of response time. Further, when city warning mode is selected, an individual located near vehicle 202 with the components of system 200 described above may have between 3-10 (or more or less as desired) seconds of response time. In one embodiment, an alarm sound (or other type of alarm warning emitted by alarm sound device 240) may be triggered to allow at least five seconds of response time when in the highway mode and at least three seconds of response time in the city mode. In one or more embodiments, shorter response time is provided for an operator of stationary vehicle 202 in city mode because the moving vehicles or oncoming objects are presumed to be moving at slower speeds than the counterpart vehicles when located on highways. Those of ordinary skill in the art will appreciate that other response times may be utilized for either highway or city warning mode.

Additionally, or alternatively, controller unit 220 may be by default configured to include a single warning mode that encompasses a longer response time. Response time as defined herein may refer to the time required before oncoming moving vehicle 150 reaches the same point or location as the stationary vehicle 120, where radar unit 125 (or radar unit 230 or radar unit 330) is mounted. Further, response time correlates to the time when an alarm is triggered by controller unit 220 (or 330). The alarm is triggered to provide a minimum amount of time for operator of the stationary vehicle to be notified of the presence of the oncoming vehicle or other moving object. As previously discussed, it is an object of these embodiments in the present description to provide a sufficient amount of warning and notification to an operator of a stationary vehicle while in his or her work zone, and sufficient time to react (e.g. reaction time) to move out of harm's way if there is a credible risk that an oncoming moving vehicle or object may collide with either the operator or the stationary vehicle or both.

For example purposes only, and without limitation thereto, vehicle 202 may be a police vehicle that may be operated by a police officer or other law enforcement personnel. When the police officer is pulling over vehicles on a highway during traffic stops, the police officer may choose to select the highway mode when vehicle 202 is parked on the side of a highway. In this mode, an alarm sound or other type of alarm (including visual flashing lights) may be triggered to allow the officer enough response time to notice the oncoming vehicle 150 and take action accordingly if needed (e.g., move away from oncoming vehicle 150). Conversely, the city warning mode may be selected when the vehicle 202 is parked on a roadway or street other than a highway. For example, on roadways and streets where there are traffic signal lights and/or stop signs, and most vehicles that are passing are moving at speeds that are typically much slower than on highways.

In an embodiment, the warning modes may include one or more weather, visibility, or road condition modes. The mode can be selected, for instance, regardless of the location of the vehicle (e.g., a highway or city road). For example, the warning mode can be a rainy weather or rainstorm condition, a slippery or icy road condition, a fog or other low visibility condition, or a nighttime mode. The risk of collision in such conditions is further increased and therefore a longer response time may be needed for the individual to move out of harm's way and avoid collision by the oncoming vehicle. The response time for such modes can be determined according to longer expected amount of reaction time in comparison to normal road, weather, or visibility conditions.

The range of detection (e.g. detection range 132), response time needed, the closing distance and/or speed threshold to trigger the alarm sound emitted from alarm sound device 240 may be determined as part of the system predefined settings by the manufacturer, e.g., via firmware or programming of the controller. Alternatively, the range of detection (e.g. detection range 132), response time needed, the closing distance, and/or speed threshold to trigger the alarm sound may also be adjustable by an operator, such as operator 101, through some suitable user interface or other user controlled selectors located on controller unit 220. Similarly, the warning modes (selected using switches 226 and 227) may also be adjustable by the operator. Although the scenario above is described in the context of a police vehicle operation, similar implementations can be applied in the context of EMS vehicles (e.g., ambulance or fire truck) or any work zone (e.g., construction) related vehicle to protect individuals from nearby passing vehicles or objects that could cause harm in case of collision or contact.

The switches can be arranged such that when a switch is turned ON, the other switch is turned off. The switches may be any type of switches known in the art, including, but not limited to, press buttons, which may be pressed by the user to select one of the two warning modes. When one mode is selected, the remaining modes are switched off. The pair of switches 226 and 227 are connected to the processor 223 via a corresponding pair of DC/DC converters 224 and 225. The processor 223 detects which switch is turned ON and accordingly determines when to trigger the alarm sound. In other embodiments, the system can include any number of switches to provide any needed number of warning modes, for instance allowing varying alarm response time. The controller unit 220 may also include a power regulator 221 connected to the power source 210.

The radar unit 230 includes electronic components for detecting objects within a range of detection. The range of detection may be defined by the radio frequency (RF) components or circuit of the radar unit 230. The components of radar unit 230 may include, without limitation, a radar integrated circuit (IC) 234 for transmitting and receiving RF signals. A processor 232 in the radar unit 230 processes the received signals from the radar IC 234 to determine the presence of an object in the range of detection (e.g. range 132 shown in FIG. 1).

In one or more embodiments, processor 232 of radar unit 230 may further process the received signals from the radar IC 234 to determine the position and orientation of an oncoming vehicle or other object. According to one embodiment, radar unit 230 may detect and relay data regarding a position and orientation of each oncoming vehicle or object that passes through a pre-defined detection range, such as detection range 134 shown in FIG. 1. Subsequently, processor 232 of radar unit 230 may analyze the position and/or orientation of an oncoming vehicle or object with respect to the position and orientation of vehicle 202, and determine whether that oncoming vehicle or object is heading in a direction to collide with vehicle 202. In some embodiments, thus, an alarm is only triggered upon detecting an oncoming moving vehicle (e.g. oncoming vehicle 150 in FIG. 1) that is headed in a direction to collide with vehicle 202.

Alternatively, the data obtained by radar unit 230 regarding the position and orientation of an oncoming vehicle or object may also be directly sent to processor 223 of controller unit 220 (e.g. via transceiver 231 in radar unit 230 to transceiver 222 in controller unit 220) so that processor 223 makes the determination whether the oncoming vehicle or object is headed in a direction so as to collide with a stationary vehicle, such as stationary vehicle 202, and whether to trigger an alarm or not.

In some embodiments, processor 232 of radar unit 230 may also process the received signals from the radar IC 234 to detect the speed and/or distance of the moving object or vehicle from vehicle 202. The detection data may be sent by a transceiver 231 in the radar unit 230 to the transceiver 222 in the controller unit 220. Alternatively, transceiver 231 of radar unit 230 may transmit the speed of the moving object (e.g via transceiver 222 on the controller unit 220) to processor 223 of the controller unit 220, such that processor 223 calculates the distance of the moving object or vehicle from vehicle 202. The radar unit 230 may also include a power regulator 233 connected to the power source 210 to regulate power.

The system allows an alarm response time according to the selected warning mode. The selected warning mode may correspond to the average speed of traffic on the road. As such, the system determines when to trigger the alarm in accordance with the speed of an oncoming vehicle (e.g. oncoming vehicles 150 or 450) moving within a range of detection (e.g. range 132 shown in FIG. 1 or range 432 shown in FIG. 4) and on a collision course with the stationary vehicle (e.g. vehicles 120 or 420). In one embodiment, controller unit 220 may determine to trigger an alarm for alarm sound device 240 when the oncoming moving vehicle reaches a threshold distance from the stationary vehicle. The used threshold distance is in accordance with the warning mode.

As discussed above, the alarm sound may be emitted to provide a varying response time depending on which predefined mode is selected (e.g. highway mode or city mode). Thus, when oncoming vehicle 150 (which is an oncoming vehicle likely to collide with vehicle 202) first reaches the border of range 132, in accordance with embodiments of the present description, radar unit 125 may proceed to detect a speed and distance of oncoming vehicle 130. The detected speed and distance may be transmitted to processor 223 of control unit 220, which may determine to trigger the alarm when the vehicle 150 reaches a suitable distance from the stationary vehicle 120. The suitable distance, referred to herein as a threshold distance, allows enough response time in accordance with the warning mode and correspondingly the traffic speed.

In an embodiment, the alarm sound can change with time as the distance between the oncoming and stationary vehicle is closing. For instance, the controller unit can signal the sound device to increase the intensity or frequency of the alarm sound as the distance is closing to communicate a sense of urgency to the individual near the stationary vehicle.

The alarm sound device 240 includes an amplifier 241 that amplifies the signal from the processor 223 to trigger the alarm sound. The speaker 242 turns the amplified signal into an alarm sound. As described above, the alarm sound device 240 and the speaker 242 may be integrated with the controller unit 220 within a single device. Alternatively, the alarm sound device 240 may be part of vehicle 202's own sound system. In yet another embodiment, the alarm sound device 240 is part of a third-party device that can be connected to the controller unit 220 via any suitable wired connection or wireless link (e.g., Bluetooth link).

In an embodiment, the alarm sound device 240 corresponds to a vehicle horn which is a manufacturer built-in component of the vehicle (e.g. stationary vehicle 202), such as a car horn. In this embodiment, the controller unit 220 can be coupled to the vehicle horn in any suitable wired or wireless connection, such as, but not limited to, an auxiliary sound cable, a universal serial bus (USB) connection, or a Bluetooth link. Alternatively, or additionally, alarm sound device 240 may be located within a portable computing device (not shown) associated with individual 101 (e.g., a smartphone, smart communications device, or any type of computing device as known in the art).

It is an objective of the present description that the alarm sound emitted by alarm sound device 230 be of a sufficient loudness to be heard by operator 101, even over the typical noises heard in traffic whether located in the city, in a rural setting, on a highway or elsewhere. In one or more embodiments, the alarm sound emitted by alarm sound device 240 may be at least 90 decibels (dB). It is noted that the alarm sound emitted by alarm sound device 240 may be higher or lower than 90 dB. It may be preferable for alarm sound to be at least 114 dB or higher. In one or more embodiments, the duration of alarm sound may be predetermined by manufacturer of alarm sound device 240, or may be selected by a user.

It is noted that in one or more configurations, a user is able to turn on and off radar unit 230, controller unit 220, and alarm sound device 240 as desired. As noted above, system 200 may be collocated within a single apparatus or device, or individual components, such as radar unit 230, controller unit 220, and alarm sound device 240, may be coupled to one another either using wires or wirelessly on separate devices. Either way, in one or more embodiments, each device may be turned on or off so that the detection and warning system 200 is used in work zones when the system 200 may be the most helpful and beneficial to a user. Those of ordinary skill in the art will appreciate that a police officer, construction worker, EMS worker, or any other type of person may not require that the system 200 be activated during regular driving or transportation from place to place. Further, a user may desire to deactivate or turn off system 200 when the vehicle is parked in a residential neighborhood, for example. Instead, system 200 presented in FIG. 2 (and elsewhere in the present description) may be the most useful when a user's vehicle is parked and the user is operating in a work zone that makes the user vulnerable to collision by oncoming vehicles or other dangerous objects.

Turning to FIG. 3, FIG. 3 shows components of another vehicle related work zone intrusion detection system in accordance with an illustrative embodiment. The system 300 shown in FIG. 3 may be used in accordance with system 100 shown in FIG. 1 and in accordance with system 200 in FIG. 2. Accordingly, vehicle 302 may operate and be in accordance with vehicle 202 in FIG. 2. The components shown in system 300 may include a controller unit 320, a radar unit 330, and an alarm sound device 340. Radar unit 330 may be a radar unit in accordance with radar unit 230 in FIG. 2. Alarm sound device 340 may be an alarm sound device in accordance with alarm sound device 240. A power source 310 supplies power to these components via suitable wiring. Power source 310 may be a power source in accordance with power source 210 in FIG. 2. GPS sensor 344 may be a GPS sensor in accordance with GPS sensor 244 in FIG. 2.

Further, at least some of the components of controller unit 320, such as power regulator 321, transceiver 322, and processor 323, may be components in accordance with corresponding components of controller unit 220 in FIG. 2. Controller unit 320 is also coupled to or includes a user interface 350 that can be used by a driver or a user to select a warning mode or adjust its parameters, such as, but not limited to, the threshold distance to trigger the alarm sound, duration of the alarm, or response time needed to take action. The user interface 350 also indicates in some manner the current selected warning mode. The user interface 350 is connected to the processor 323 which uses the user input selection to determine when to trigger the alarm sound. The user interface 350 can be part of the controller unit 320. Alternatively, the user interface 350 may be separate from the controller unit 320 and positioned anywhere accessible to the driver or user and connected to the controller unit 320. For example, and without limitation, the user interface 350 can be part of the vehicle dashboard or front panel. The user input interface 350 can include any number of knobs or press buttons (or other selectors known in the art) to select from multiple warning modes or to change mode parameters as described above. In another embodiment, the user interface 350 corresponds to a touch screen for selecting or adjusting the warning mode. In an embodiment, the user interface 350 and possibly other components of the controller unit 320 or alarm sound device 340 may be implemented on a smart communications device, such as a smartphone or a computer tablet.

The radar unit 330 includes electronic components for detecting objects within a range of detection. The range of detection may be defined by the radio frequency (RF) components or circuit of the radar unit 330. The components of radar unit 330 may include, without limitation, a radar integrated circuit (IC) 334 for transmitting and receiving RF signals. A processor 332 in the radar unit 330 processes the received signals from the radar IC 334 to determine the presence of an object, including moving vehicles, in the range of detection (e.g. range 132 shown in FIG. 1 or range 432 in FIG. 4). The processor 332 also processes the signals to detect the speed and/or distance of the moving object or vehicle from vehicle 302. Further, processor 332 may process the received signals from the radar IC 334 to determine a position and orientation of an oncoming vehicle or other object with respect to vehicle 302, in accordance with the description provided above for processor 232's detection of an oncoming vehicle's position and/or orientation.

The detection data is sent by a transceiver 331 in the radar unit 330 to the transceiver 322 in the controller unit 320. Alternatively, transceiver 331 of radar unit 330 may transmit the speed of the moving object (e.g. via transceiver 322 on the controller unit 320) to processor 323 of the controller unit 320, such that processor 323 calculates the distance of the moving object or vehicle from vehicle 202. The radar unit 330 may also include a power regulator 333 connected to the power source 310 to regulate power. Alarm sound device 340 may include amplifier 341 and speaker 342, which may be used to emit an audible alarm sound, similar to alarm sound device 240.

Thus, the system 300 shown in FIG. 3 may be used to provide detection and warning to an operator, such as operator 101 shown in FIG. 1 or operator 401 shown in FIG. 4, of any oncoming moving objects, and in particular oncoming moving vehicles, such as oncoming moving vehicle 150 or oncoming vehicle 450, that operator 101 or 401 may need to be aware of. An alarm may be emitted by alarm sound device 340 based on the response time and selected warning mode, e.g. highway warning mode or city warning mode, to provide an alarm to a user.

Turning to FIG. 4, a pictorial illustration of a detection and warning system mounted on a construction related or public works vehicle in accordance with an illustrative embodiment. System 400 shown in FIG. 4 may be a detection and warning system for warning individuals located in a work zone near a highway or roadway. As shown in FIG. 4, vehicle 420 is a stationary vehicle that is located on a side of roadway 436. The workers pictured in FIG. 4, are located to the side of roadway 436. Their work zone 404 is subject to risk of collision by oncoming vehicles, such as oncoming vehicle 450, or other fast-moving and/or dangerous objects. Accordingly, system 400 may be used to alert one or more of the individuals (e.g. 401) working in work zone 404 to pay attention as oncoming vehicles, such as oncoming vehicle 450, enter a predefined detection range 434 that is near work zone 404. FIG. 4 includes oncoming vehicle 450, which as shown in FIG. 4, appears to have moved out of its designated lane and is traveling in a direction so as to collide into the workers in the work zone shown in FIG. 4, such as worker 401 in work zone 404, and/or collide directly into stationary vehicle 420.

System 400 may be in accordance with any of the systems 100, 200, and 300 as pictured in FIGS. 1-3 and as described above. Accordingly, controller unit 442 may operate and may be in accordance with a controller unit 220 in FIG. 2 and controller unit 320 in FIG. 3. Further, radar unit 425 may operate and may be in accordance with radar unit 125, 230, and 330 as described above. Additionally, alarm sound device 440 may operate and may be in accordance with alarm sound device 240 and 340. Each component in FIG. 4 may operate as described above and provide In one or more embodiments, stationary vehicle 420 belongs to operator 401, who may be working as shown along the side of roadway 436. Operator 401 may be any type of individual, including a construction, public service, or other type of individual. Operator 401 may have powered on radar unit 425, controller unit 442, and alarm sound device 440 by turning on vehicle 420 or radar unit 425, controller unit 442, and alarm sound device 440 may include their own power source (e.g. batteries), and may be switched on independently. Even though FIG. 4 shows that radar unit 425, controller unit 442, and alarm sound device 440 are each located as separate devices on an internal or external surface of vehicle 420, in alternative embodiments, radar unit 425, controller unit 442, and alarm sound device 440 may all be collocated within a housing of a single device.

Controller unit 442 may be mountable on any surface of stationary vehicle 420. In one or more embodiments, controller unit 442 may be located proximate to the driver's side of vehicle 420, such that the operator of vehicle 420 may easily power on and off controller unit 442 and also select one or more switches (e.g. warning mode switches for highway warning mode or city warning mode as previously discussed).

In one or more embodiments, as oncoming vehicle 430 approaches closer and moves within range 432, radar unit 425 may detect a position, orientation, and speed of oncoming vehicle 430. Further, in one embodiment, radar unit 425 may further determine a distance, such as distance 434, of oncoming vehicle 430 from stationary vehicle 420 using the speed (i.e. distance/time) of oncoming vehicle 430. A processor within radar unit 425 (e.g. processor 232 or 332) may determine based on data regarding the position and orientation of oncoming vehicle 430 whether oncoming vehicle 430 is moving in a direction so as to collide with vehicle 420. As shown in FIG. 4, oncoming vehicle 430 is not moving directly towards vehicle 420, but rather is traveling in a direction parallel to vehicle 420 and is not likely to collide with any part of vehicle 420. On the other hand, oncoming vehicle 450 appears to be headed towards stationary vehicle 420 in such a manner so as to collide with stationary vehicle 420.

Advantageously, radar unit 425 may obtain the data related to the position and orientation of oncoming vehicle 450, and may detect that oncoming vehicle 450 is traveling directly towards vehicle 420. Radar unit 425 may thus be configured to transmit a request to trigger an alarm in response to detecting oncoming vehicle 450. The alarm may be emitted from sound device 440, which may be collocated in a single device with controller unit 442 and/or radar unit 425 in alternative embodiments.

Additionally, in one or more embodiments, operator 401 may have selected a pre-defined warning mode using one or more switches either coupled to or located on controller unit 442. There may be any number of pre-defined warning modes, however, in one embodiments, there are at least two modes, e.g. highway warning mode and city warning mode, which may be in accordance with these warning modes as explained previously in the present description. For example purposes only, if user 401 choose to select city warning, then an alarm sound may be emitted from alarm sound device 440 to provide a lower response time for user 401 to be notified via the alarm sound as compared with the longer response time were user 401 to select the highway warning mode.

Ultimately, an objective of system 400 is to alert operator 401 and his or her co-workers via alarm sounds to pay attention to the presence of moving traffic or objects, including oncoming vehicle 450, that may be passing by their work zone (e.g. work zone 404). In one or more embodiments, operator 401 may choose not to provide power from a designated power source (e.g. power source 210) to radar unit 425, controller unit 442, or alarm sound device 440, and thus system 400 may be non-operational for any period of time that operator 401 desires. For example, if there is a low risk of collision, for example, it is not a busy time of day and there are very few oncoming vehicles or it is broad daylight and operator 401 feels more secure that he or she is alert and aware of surrounding activity, operator 401 may voluntarily choose not to power on the above-described components of system 400.

Figure 5:
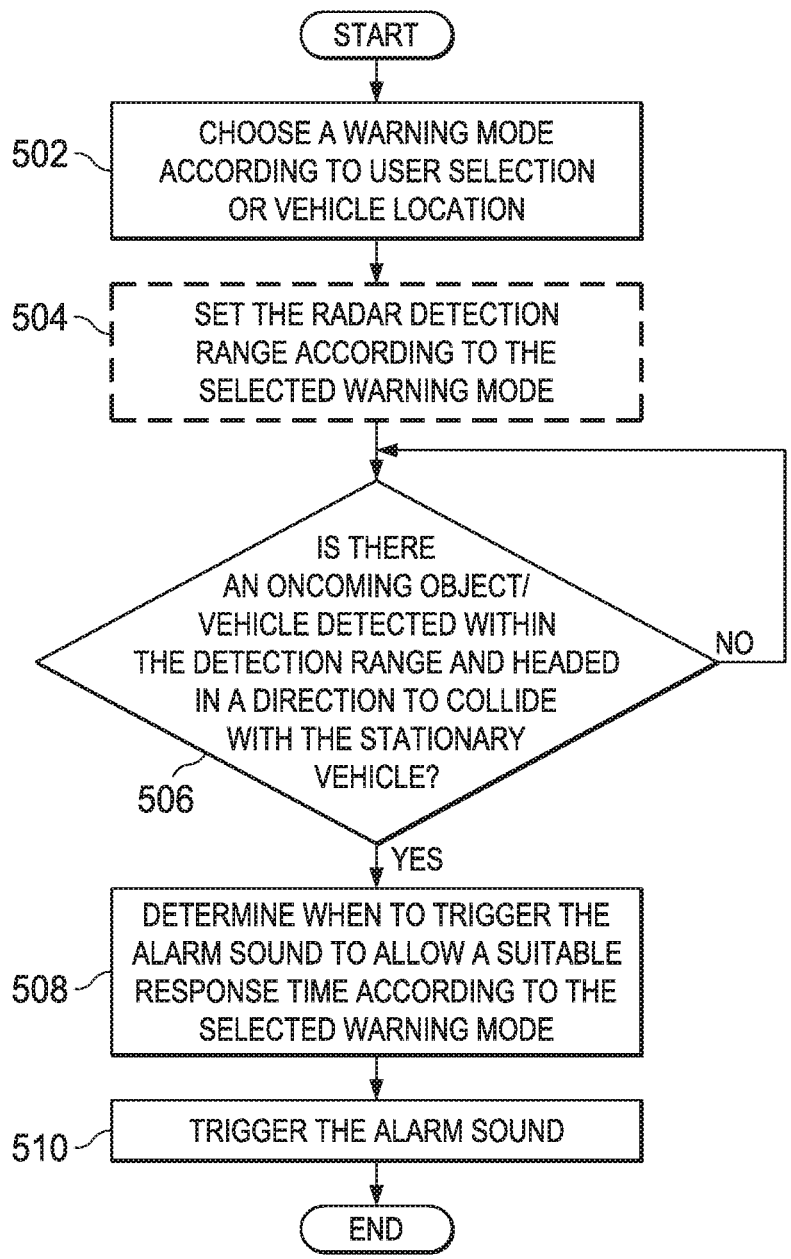
FIG. 5 is a flowchart illustrating a process for detecting and warning against intrusion in a work zone around a vehicle or other oncoming object in accordance with an illustrative embodiment.

Turning to FIG. 5, FIG. 5 is a flowchart illustrating a process for detecting and warning against intrusion in a work zone around a vehicle in accordance with an illustrative embodiment. The process described in FIG. 5 may utilize one or more components of the controller systems shown in FIGS. 1-4 described above, such as, without limitation, the components of controller unit 220 or 320, radar units 230 or 330, and alarm sound device 240 or 340.

In one exemplary embodiment, the process may correspond to selecting one of two or more available defined warning modes for oncoming speeding vehicles next to a work zone, such as in the case of a police stop scenario described in FIG. 1 or the scenario pictured in FIG. 4. The process may begin by choosing a suitable warning mode according to user selection or vehicle location (step 502). The controller, such as the controller unit 220, 320, or 442, selects the active warning mode according to user selection via the user interface (e.g. user interface 350) or ON/OFF mode switch (e.g. switches 226 and 227). For example, the police officer may select the highway mode when the police vehicle stops and pulls over a speeding vehicle on a highway. Alternatively, the controller may select the operation warning mode automatically according to the location of the police vehicle using GPS or location data (e.g. using GPS sensors 244 or 344).

Next, the process may include setting the radar detection range according to the selected warning mode (step 504). For instance, a larger detection range can be used in case of the highway mode in comparison to the city mode, since oncoming vehicles at higher speeds on highways or other freeways can close the distance with a stationary vehicle in shorter time and thus require a longer distance detection to allow enough response time. The detection range can be part of predefined mode settings or can be adjustable by a user using one or more selectors located on a controller unit (e.g. controller units 220, 320, or 425) for selecting the detection range. The controller unit may then send the necessary signal to the radar unit to set the suitable detection range. In an embodiment, this step may be skipped and a single suitable detection range may be used for all available warning modes.

When the detection range is set, the controller checks whether an oncoming vehicle or object is detected within the range (step 506). Further, the radar unit determines the position and orientation of an oncoming vehicle, and whether the oncoming vehicle is headed in a direction to collide with the stationary vehicle. When such vehicle is detected, the radar unit can signal the controller unit.

When an oncoming vehicle or object is detected that is moving directly towards a stationary vehicle so as to collide with the stationary vehicle, the controller determines when to trigger the alarm sound and allow a remaining response time according to the selected warning mode (step 508). The alarm can be triggered when the oncoming vehicle reaches a threshold distance in accordance with the warning mode (step 510). For example, if at least five seconds (without limitation thereto) are needed for the officer to be provided with enough reaction time to respond in the case of a highway mode (where vehicles move at much higher speeds), the controller obtains the speed of the oncoming vehicle from the radar unit. Based on the speed of the oncoming vehicle at the time of detection, the controller (or radar) unit estimates the distance of the oncoming vehicle from the stationary vehicle. The distance changes as the moving vehicle reaches closer to the stationary vehicle. Upon reaching a suitable threshold distance that allows enough response time, the controller triggers the alarm sound which allows a remaining response time before the distance between the oncoming vehicle and the stationary vehicle on which the system is mounted is down or close to zero.

In an embodiment, the alarm sound can change with time as the distance between the oncoming and stationary vehicle is closing. For instance, the controller unit can signal the sound device to increase the intensity or frequency of the alarm sound as the distance is closing to communicate a sense of urgency to the individual near the stationary vehicle.

Beneficially, one or more embodiments of a detection and warning system for detecting and warning an individual of an oncoming vehicle or other object that is approaching the individual's stationary vehicle, and provide the individual with time to react and to move out of the way to avoid collision. Advantageously, the embodiments of the warning and detection system presented herein may save the lives of many individuals, including police officers, EMS, public safety, construction, and roadside employees and/or personnel. It may also be used by ordinary citizens who would like to further protect themselves and their family members in case they find themselves having to exit and be located outside of a stationary vehicle in high risk collision areas, such as highways and other roadways. In one or more embodiments, a control unit as presented herein may be mounted anywhere that is suitable on any location in or on a vehicle. It may also be, beneficially, configured so that the user may select the parameters used by a warning and detection system, such as the range, speed, threshold distance, and response times before a warning sound is emitted.

The flowchart and block diagrams in the figures illustrate the architecture, functionality, and operation of possible implementations of the controller system components according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader spirit and scope of the invention as set forth in the claims. It is also understood that other embodiments may be utilized and that logical structural, mechanical, chemical, and/or electrical changes may be made without departing from the spirit or scope of the invention.

What is claimed is:

1. An apparatus for a vehicle, the apparatus comprising:
a housing of the apparatus, wherein the apparatus is configured to detect an oncoming vehicle with respect to a stationary vehicle, the housing further comprising:
a processor configured to receive radar detection data about an oncoming vehicle or object and determine when to trigger an alarm sound in accordance with the radar detection data and in accordance with a determination that the oncoming vehicle or object is moving in a direction to collide with the stationary vehicle,
wherein the radar detection data indicates at least one of speed and distance of the oncoming vehicle or object with respect to the stationary vehicle,
and further wherein the radar detection data indicates a position and orientation of the oncoming vehicle or object with respect to the stationary vehicle;
one or more switches, wherein the one or more switches are adapted for selecting one or more warning modes comprising a highway mode and a city mode, wherein the highway mode provides a greater response time than a response time provided for the city mode, wherein the alarm sound is triggered earlier for the highway mode than for the city mode, and further comprising a warning mode to provide a greater response time depending on a road condition or a weather condition; and
a transceiver coupled to the processor and configured to receive the radar detection data from a radar unit.

2. The apparatus of claim 1, wherein the apparatus further comprises or is coupled to an alarm sound device comprising a speaker for sounding the alarm sound.

3. The apparatus of claim 1, wherein the apparatus further comprises or is coupled to the radar unit, wherein the radar unit is configured to send the radar detection data to the transceiver.

4. The apparatus of claim 3, wherein the processor is located in a separate control unit and not located in a same device as the radar unit.

5. The apparatus of claim 3, wherein the radar unit is mountable on a surface of the stationary vehicle.

6. The apparatus of claim 3, wherein the radar unit and the processor are collocated in a single device box.

7. The apparatus of claim 1, wherein the apparatus further comprises or is coupled to a user interface for selecting or adjusting one or more warning modes, and wherein the processor is further configured to determine when to trigger the alarm sound in accordance with a selected warning mode.

8. The apparatus of claim 1, wherein the apparatus further comprises or is coupled to a global positioning system (GPS) configured to detect a location of the stationary vehicle for selecting one or more warning modes, and wherein the processor is further configured to determine when to trigger the alarm sound in accordance with a selected warning mode.

9. A method of warning an operator of a stationary vehicle, comprising:
obtaining, from a radar unit, radar detection data for a moving vehicle or object approaching the stationary vehicle; and
determining, using a processor and a transceiver coupled to the processor and configured to receive the detection data from the radar unit, when to trigger an alarm sound to allow a response time according to the detection data and a selected one or more warning modes;
determining a position and orientation of the moving vehicle or object with respect to the stationary vehicle; and
upon determining that the moving vehicle or object is moving in a direction to collide with the stationary vehicle based on the position and orientation of the moving vehicle or object, triggering the alarm sound to alert the operator of the stationary vehicle of an oncoming moving vehicle or object further comprising:
triggering a timing of the alarm sound based on the one or more selected warning modes, which are selected using one or more mode switches, wherein the one or more selected warning modes comprises a highway mode and a city mode, wherein the alarm sound is triggered earlier for the highway mode than the city mode, and further comprising triggering the timing of the alarm sound based on a warning mode to provide a greater response time depending on a road condition or a weather condition.

10. The method of claim 9, wherein the one or more warning modes are selected according to user input or global positioning system (GPS) data.

11. The method of claim 9, wherein the detection data includes at least one of speed and distance of the moving vehicle or object, and wherein triggering the alarm sound is determined according to at least one of the speed and the distance of the oncoming moving vehicle or object.

12. The method of claim 9, wherein the alarm sound is triggered when the moving vehicle reaches a threshold distance from the stationary vehicle, and wherein the threshold distance is selected in accordance with the warning mode.

13. The method of claim 9, wherein the one or more warning modes are selected in accordance with traffic limit speed or average speed on a highway or roadway.

14. The method of claim 9, further comprising setting a detection range for the radar unit according to the one or more warning modes.

15. An apparatus for warning an operator of a stationary vehicle, the apparatus comprising:
a controller unit configured for work zone intrusion detection related to the stationary vehicle, wherein the controller unit is connectable to a radar unit mountable on the stationary vehicle, wherein the controller unit is configured to receive detection data from the radar unit indicating an oncoming vehicle or object, including detection data related to a position and orientation of the oncoming vehicle or object with respect to the oncoming vehicle or object, and to trigger an alarm sound in accordance with the detection data to allow a response time according to one or more warning modes and according to a determination that the oncoming vehicle or object is moving in a direction to collide with the stationary vehicle;
one or more mode switches adapted for selecting the one or more warning modes, the one or more warning modes comprising a highway mode and a city mode, wherein the highway mode provides a greater response time than a response time provided for the city mode, wherein the alarm sound is triggered earlier for the highway mode than if the city mode is selected, and further comprising a warning mode to provide a greater response time depending on a road condition or a weather condition; and a transceiver coupled to the processor and configured to receive the radar detection data from a radar unit.

16. The apparatus of claim 15, wherein the apparatus further comprises or is coupled to a sound device comprising a speaker for sounding the alarm sound.

17. The apparatus of claim 15, wherein the radar unit and the controller unit are collocated in a single device.

18. The apparatus of claim 15, wherein the controller unit and the radar unit are mountable on a surface on or in the stationary vehicle.

* * * * *